(12) United States Patent
Furuta

(10) Patent No.: US 9,665,057 B2
(45) Date of Patent: May 30, 2017

(54) DRIVING DEVICE AND IMAGE FORMING APPARATUS INCLUDING THE SAME

(71) Applicant: KYOCERA Document Solutions Inc., Osaka (JP)

(72) Inventor: Shinji Furuta, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/137,154

(22) Filed: Apr. 25, 2016

(65) Prior Publication Data

US 2016/0313689 A1 Oct. 27, 2016

(30) Foreign Application Priority Data

Apr. 27, 2015 (JP) .................................. 2015-090432

(51) Int. Cl.
| | |
|---|---|
| *F16H 7/08* | (2006.01) |
| *G03G 15/00* | (2006.01) |
| *F16H 37/02* | (2006.01) |
| *G03G 21/16* | (2006.01) |

(52) U.S. Cl.
CPC ............ *G03G 15/757* (2013.01); *F16H 37/02* (2013.01); *G03G 21/1647* (2013.01)

(58) Field of Classification Search
CPC ...... F16H 7/08; F16H 2007/0893; F16H 7/20; F16H 2007/0868; G03G 15/757
See application file for complete search history.

(56) References Cited

U.S. PATENT DOCUMENTS

| | | | | |
|---|---|---|---|---|
| 2004/0184837 A1* | 9/2004 | Kinouchi | ........... | G03G 15/0121 399/227 |
| 2009/0111630 A1* | 4/2009 | Kume | ........... | F16H 7/14 474/133 |
| 2010/0016106 A1* | 1/2010 | Minemura | ........... | B41J 3/4071 474/113 |
| 2012/0252617 A1* | 10/2012 | Lin | ........... | F16H 7/08 474/148 |
| 2013/0259529 A1* | 10/2013 | Yamamoto | ........... | G03G 21/1633 399/167 |
| 2016/0146312 A1* | 5/2016 | Pfeifer | ........... | F16H 7/08 474/135 |
| 2016/0272444 A1* | 9/2016 | Shoji | ........... | B65H 5/004 |

FOREIGN PATENT DOCUMENTS

JP 2010-65808 3/2010

* cited by examiner

*Primary Examiner* — David Banh
(74) *Attorney, Agent, or Firm* — Wenderoth, Lind & Ponack, L.L.P.

(57) ABSTRACT

A driving pulley has a driving pulley body having a peripheral surface formed in a cylindrical shape, and a driving pulley shaft and a gear part, which are coaxial with the driving pulley body and rotate together with the driving pulley body. The driving device has an input gear and a support plate. The input gear is engaged with the gear part to input rotational driving force to the gear part. The support plate has a support hole that supports the driving pulley shaft so as to be rotatable. The support hole is a long hole extending along a concentric circle for an axis center of the input gear and supporting the driving pulley shaft so as to be movable along the concentric circle.

4 Claims, 4 Drawing Sheets

DRIVING DEVICE AND IMAGE FORMING APPARATUS INCLUDING THE SAME

CROSS-REFERENCE TO RELATED APPLICATION

This application is based upon and claims the benefit of priority from Japanese Patent Application No. 2015-090432 filed on Apr. 27, 2015, the entire contents of which are incorporated herein by reference.

BACKGROUND

The technology of the present disclosure relates to a driving device including a driving pulley, a driven pulley, and an endless transmission belt wound around both pulleys, and an image forming apparatus including the driving device.

Conventionally, for example, there is known a belt driven type driving device mounted in an image forming apparatus. The driving device includes a driving pulley, a driven pulley, and an endless transmission belt wound around both pulleys. The driving device transmits rotational driving force from a driving source (a motor and the like) inputted to the driving pulley to the driven pulley by the transmission belt. The driving device further includes a tension pulley for adjusting the tension of the transmission belt. The tension pulley abuts the transmission belt from a radial inside or outside, thereby applying tension thereto. A worker performs position adjustment of the tension pulley in assembling the driving device, thereby enabling the tension of the transmission belt to be adjusted.

SUMMARY

A driving device according to one aspect of the present disclosure includes a driving pulley, a driven pulley, and an endless transmission belt wound around both pulleys.

The driving pulley has a driving pulley body, a driving pulley shaft, and a gear part. The driving pulley body has a peripheral surface formed in a cylindrical shape. The driving pulley shaft and the gear part are arranged to be coaxial with the driving pulley body and rotate together with the driving pulley body.

The driving device further includes an input gear and a support plate. The input gear is engaged with the gear part to input rotational driving force to the gear part. The support plate has a support hole that supports the driving pulley shaft so as to be rotatable. The support hole is a long hole extending along a concentric circle for an axis center of the input gear. The support hole supports the driving pulley shaft so as to be movable along the concentric circle.

DETAILED DESCRIPTION

Hereinafter, an example of an embodiment will be described in detail on the basis of the drawings. It is noted that the technology of the present disclosure is not limited to the following embodiments.

Embodiment

Figure 1:
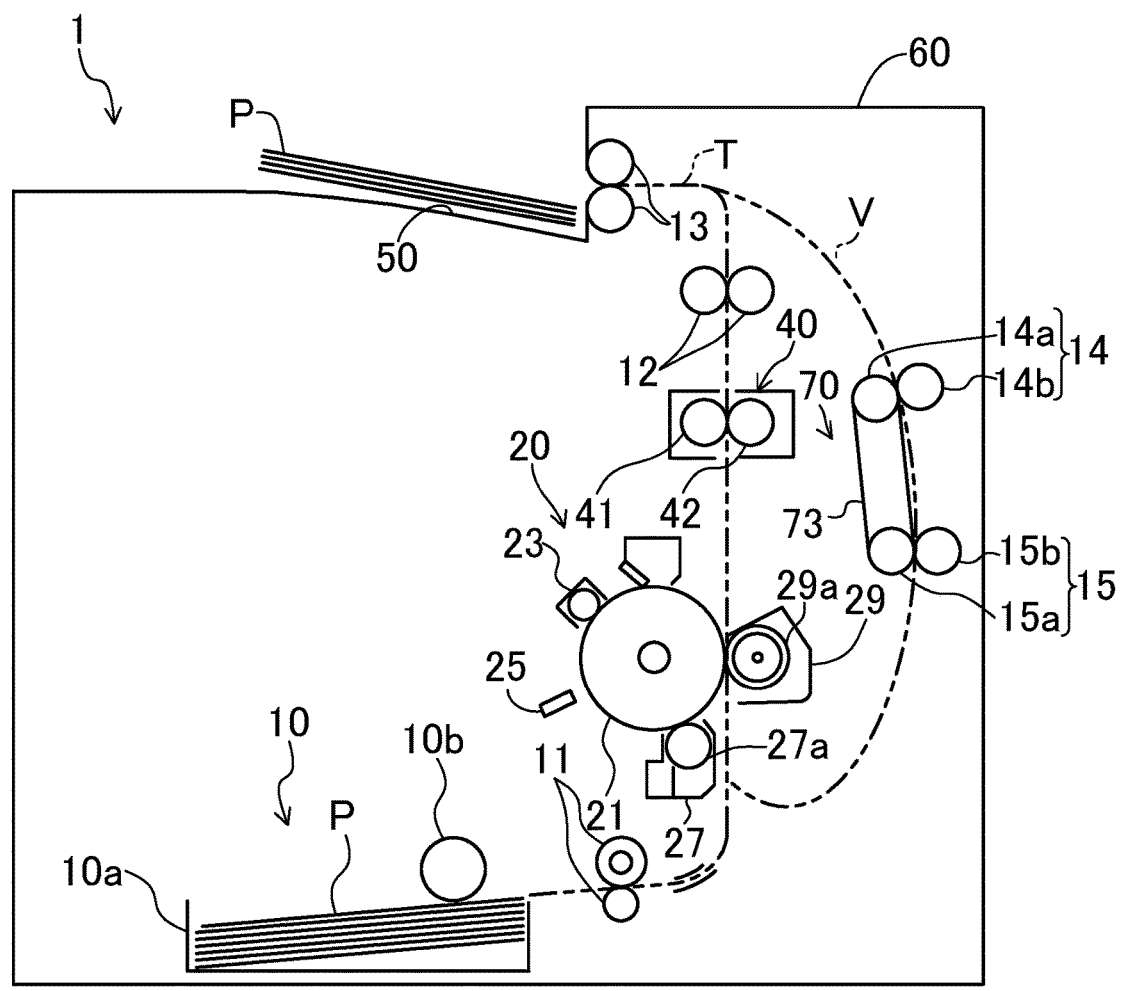
FIG. 1 is a schematic configuration diagram illustrating an image forming apparatus including a driving device in an embodiment.

FIG. 1 illustrates an image forming apparatus 1 including a driving device 70 in the present embodiment. In the present embodiment, the image forming apparatus 1 includes a monochrome laser printer.

The image forming apparatus 1 includes a paper feeding unit 10, an image forming unit 20, a fixing unit 40, a paper discharge unit 50, and a casing 60. On a paper conveyance path T from the paper feeding unit 10 to the paper discharge unit 50, a plurality of conveying roller pairs 11 to 13 are arranged to convey a paper P while interposing it therebetween.

The paper feeding unit 10 is arranged at a lower portion of the casing 60. The paper feeding unit 10 has a paper feeding cassette 10a in which the paper P having a sheet shape is received, and a pick-up roller 10b for taking out the paper P in the paper feeding cassette 10a and sending out the paper P to an exterior of the cassette. The paper P sent out to the exterior of the cassette from the paper feeding cassette 10a is supplied to the image forming unit 20 via the conveying roller pair 11.

The image forming unit 20 has a photosensitive drum 21, a charging device 23, an exposure device 25, a developing device 27, a transfer device 29, and a toner container (not illustrated). In the image forming unit 20, the peripheral surface of the photosensitive drum 21 is charged by the charging device 23, and then laser light based on document image data (for example, image data of a document image received from an external terminal) is irradiated to the surface of the photosensitive drum 21 by the exposure device 25, so that an electrostatic latent image is formed. The electrostatic latent image formed (carried) on the surface of the photosensitive drum 21 is developed by the developing device 27 as a toner image. The toner image developed by the developing device 27 is transferred to the paper P supplied from the paper feeding unit 10 by the transfer device 29. The paper P after the transfer is supplied to the fixing unit 40 by a transfer roller 29a of the transfer device 29 and the photosensitive drum 21.

The fixing unit 40 has a heating roller 41 and a pressure roller 42 brought into press contact with the heating roller 41 with predetermined pressing load. Inside the heating roller 41, a halogen lamp (not illustrated) serving as a heating means is arranged. A peripheral surface of the heating roller 41 is heated by heat generated from the halogen lamp.

The fixing unit 40 presses and heats the paper P supplied from the image forming unit 20 between the heating roller 41 and the pressure roller 42, thereby fixing the toner image to the paper P. Then, the paper P with the toner image fixed by the fixing unit 40 is sent out to a downstream side by the both rollers 41 and 42. The sent paper P is discharged to the paper discharge unit 50 formed on an upper surface of the casing 60 by the plurality of conveying roller pairs 12 and 13 provided along the paper conveyance path T.

A branch conveyance path V is connected to an upper end portion of the paper conveyance path T. The branch conveyance path V is a conveyance path for supplying the paper P to the image forming unit 20 again at the time of duplex printing. An upper end portion of the branch conveyance path V is connected to a downstream side from the conveying roller pair 12 in the paper conveyance path T, and a lower end portion of the branch conveyance path V is connected to an upstream side from the image forming unit 20 in the paper conveyance path T.

At the branch conveyance path V, an upper conveying roller pair 14 and a lower conveying roller pair 15 are vertically arranged in a row. The conveying roller pairs 14 and 15 have driving rollers 14a and 15a and driven rollers 14b and 15b that are rotated according to the driving rollers 14a and 15a, respectively.

Figure 2:
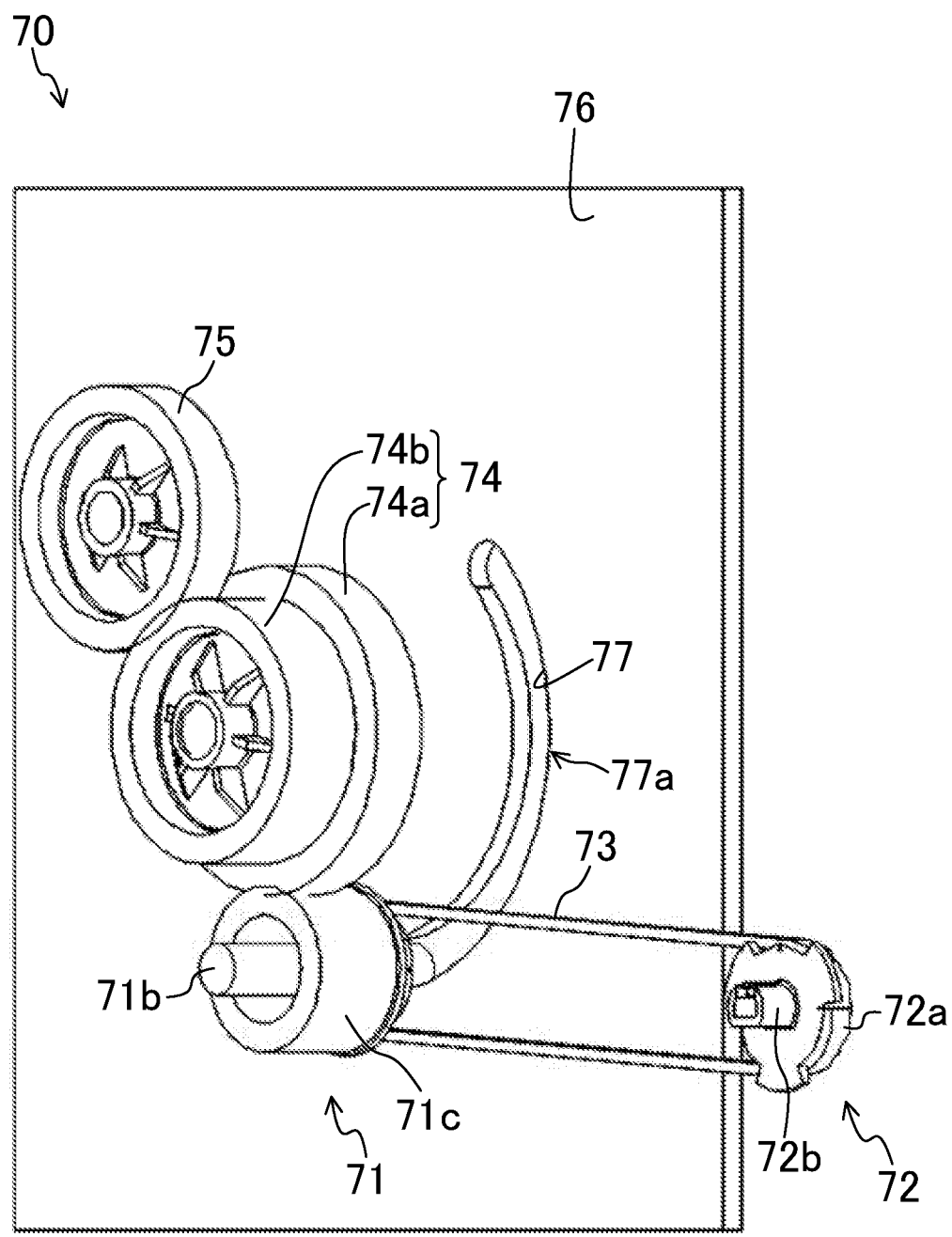
FIG. 2 is a perspective view illustrating a schematic configuration of a driving device.

The driving rollers 14a and 15a of the conveying roller pairs 14 and 15 are rotationally driven by a driving device 70. As illustrated in FIG. 2, the driving device 70 includes a driving pulley 71, a driven pulley 72, an endless transmission belt 73 wound around both pulleys 71 and 72, an input gear 74, and a support plate 76. To the driving pulley 71, the driving roller 14a of the upper conveying roller pair 14 has been connected, and to the driven pulley 72, the driving roller 15a of the lower conveying roller pair 15 has been connected.

Figure 3:
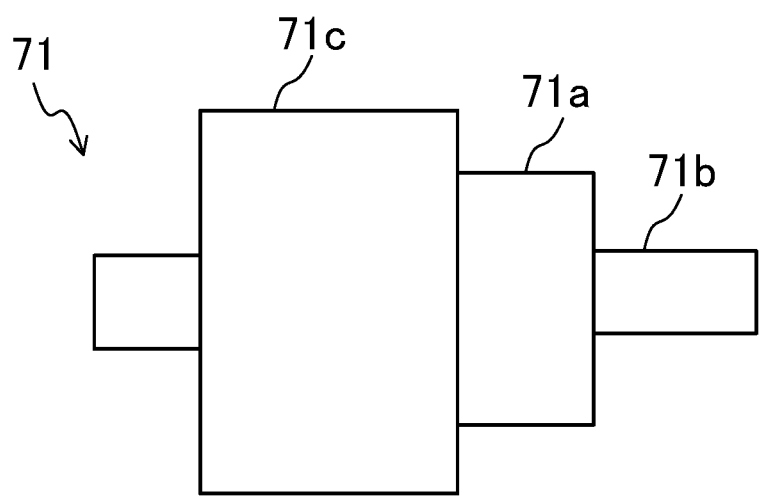
FIG. 3 is a side view of a driving pulley viewed from outside in a pulley radial direction.

The driving pulley 71 has a driving pulley body 71a (see FIG. 3), a driving pulley shaft 71b, and a gear part 71c. An outer peripheral surface of the driving pulley body 71a is formed in a cylindrical shape. The transmission belt 73 is wound around the outer peripheral surface of the driving pulley body 71a. The driving pulley shaft 71b passes through an axis center of the driving pulley body 71a. The driving pulley shaft 71b is coaxially fixed to the driving pulley body 71a and rotates together with the driving pulley body 71a. The gear part 71c is arranged at one side in an axial direction of the driving pulley body 71a. The gear part 71c is coaxially fixed to the driving pulley body 71a and rotates together with the driving pulley body 71a.

Figure 4:
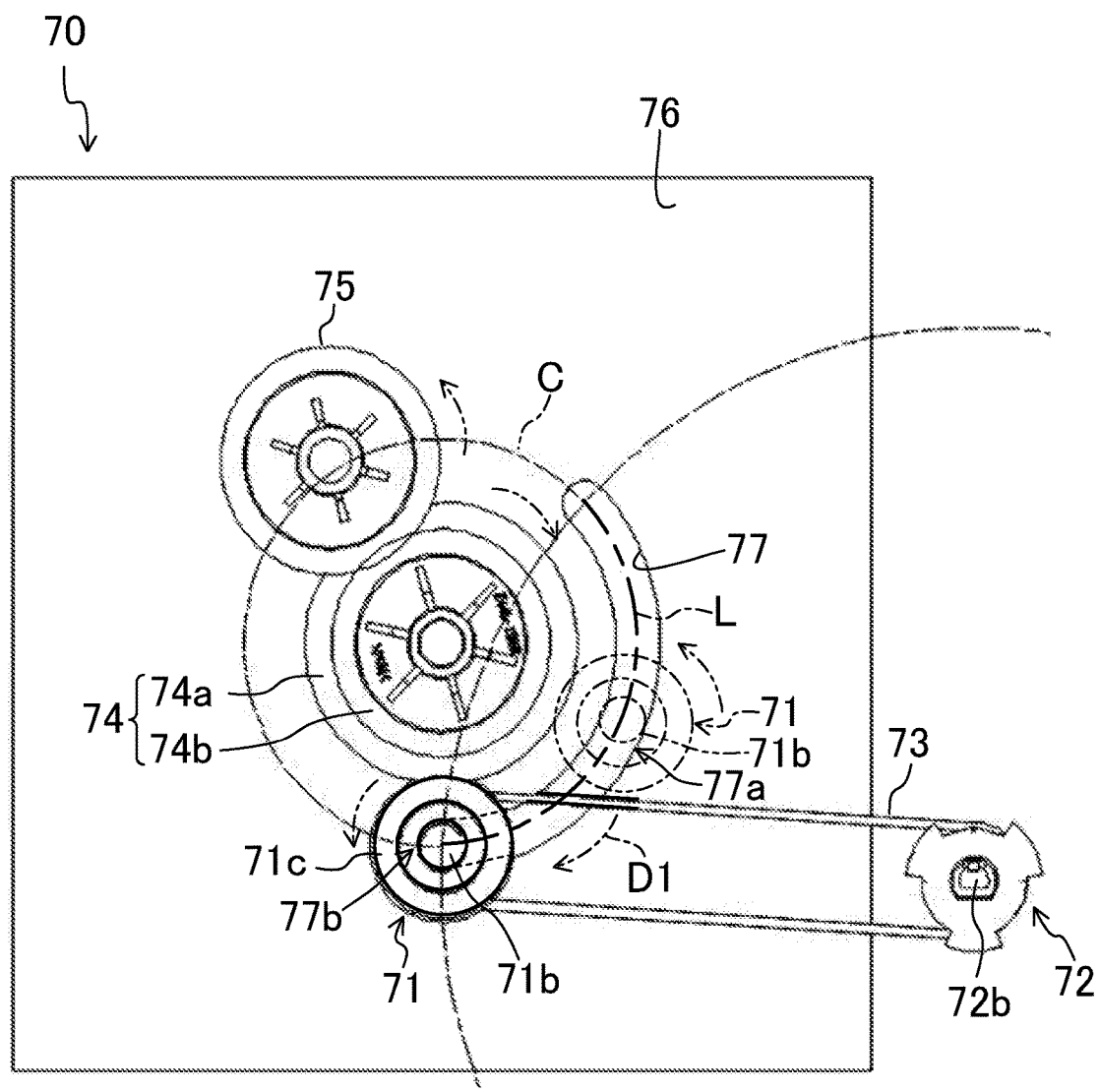
FIG. 4 is an explanation diagram for explaining a tension adjustment process of a transmission belt in a driving device.

As illustrated in FIG. 4, the gear part 71c of the pulley 71 is coupled to the input gear 74. The input gear 74 is supported to the support plate 76 so as to be rotatable. The input gear 74 is formed by stacking a large diameter gear part 74a and a small diameter gear part 74b in an axial direction. The large diameter gear part 74a of the input gear 74 is engaged with the gear part 71c of the driving pulley 71, and the small diameter gear part 74b is engaged with a motor gear 75 supported to the support plate 76. The motor gear 75 is fixed to an output shaft of a rotary motor (not illustrated).

As illustrated in FIG. 4, the driving pulley shaft 71b is supported to a support hole 77 formed in the support plate 76. The support hole 77 includes an arc-shaped long hole extending along a concentric circle C for an axis center of the input gear 74. An arcuate line L passing through a center position in a width direction of the support hole 77 constitutes a part of the concentric circle C. A radius of the concentric circle C is almost equal to the sum of a radius of an engagement pitch circle of the large diameter gear part 74a of the input gear 74 and a radius of an engagement pitch circle of the gear part 71c of the driving pulley 71. A width of the support hole 77 is equal to or slightly larger than a diameter of the driving pulley shaft 71b. The driving pulley shaft 71b passes through the support hole 77 and is movable in a circumferential direction along the support hole 77.

The support hole 77 has a first support part 77a, which is a center part in the circumferential direction of the support hole 77, and a second support part 77b, which is one end portion in the circumferential direction of the support hole 77. At the first support part 77a, an interaxial distance between an axis center of the driving pulley shaft 71b and an axis center of the driven pulley 72 becomes shorter than a setting distance set in advance. The second support part 77b is positioned at a downstream side (a front side in the rotational direction) from the first support part 77a in the rotational direction of the input gear 74. At the second support part 77b, the interaxial distance between the axis center of the driving pulley shaft 71b and the axis center of the driven pulley 72 becomes equal to the setting distance.

Returning to FIG. 2, the driven pulley 72 has a driven pulley body 72a and a driven pulley shaft 72b. An outer peripheral surface of the driven pulley body 72a is formed in a cylindrical shape. The transmission belt 73 is wound around the outer peripheral surface of the driven pulley body 72a. The driven pulley shaft 72b is coaxially fixed to the driven pulley body 72a and rotates together with the driven pulley body 72a. The driven pulley shaft 72b is rotatably supported by a fixed bearing (not illustrated) fixed to the casing 60.

Next, with reference to FIG. 4, an assembly procedure of the driving device 70 will be described. Firstly, a worker inserts the driven pulley shaft 72b into the fixed bearing (not illustrated). Next, the worker allows the driving pulley shaft 71b to pass through the first support part 77a of the center part of the support hole 77 while temporarily holding the driving pulley 71 with his/her hands. In this state, the worker winds the transmission belt 73 around the driving pulley 71 and the driven pulley 72. At this time, since the interaxial distance between the axis center of the driving pulley shaft 71b and the axis center of the driven pulley shaft 72b is shorter than the setting distance, the transmission belt 73 is slightly loosened. After winding the transmission belt 73 around both pulleys 71 and 72, when the motor is driven, rotational driving force is transmitted to the small diameter gear part 74b of the input gear 74 by the motor gear 75, so that the input gear 74 rotates. When the input gear 74 rotates, rotational driving force is transmitted to the gear part 71c of the driving pulley 71 by the large diameter gear part 74a of the input gear 74 and pressing force (force toward the rotation downstream side from the rotation upstream side of the input gear 74) acts on the entire driving pulley 71 in a direction indicated by an arrow D1. As a consequence, the driving pulley shaft 71b starts to move to the downstream side from the first support part 77a in the rotation direction of the input gear 74. Then, the driving pulley shaft 71b reaches one side end portion (that is, the second support part 77b) in the circumferential direction of the support hole 77 and thus the movement of the driving pulley shaft 71b is stopped, so that the interaxial distance between the axis center of the driving pulley shaft 71b and the axis center of the driven pulley shaft 72b becomes the setting distance set in advance. In this way, tension set in advance is applied to the transmission belt 73. Accordingly, the assembly work of the driving device 70 is completed.

So far, as described above, in the aforementioned embodiment, the driving pulley shaft 71b is configured to be movable along the support hole 77 extending along the concentric circle C for the axis center of the input gear 74. Consequently, the input gear 74 rotates and thus the driving pulley shaft 71b moves in the circumferential direction along the support hole 77, so that the tension of the transmission belt 73 is automatically adjusted. Thus, in assembling the driving device 70, a worker does not need to adjust the position of a tension roller. Thus, the assembling work efficiency of the driving device 70 is improved as much as possible.

Furthermore, in the aforementioned embodiment, the support hole 77 has the first support part 77a, at which the interaxial distance between the axis center of the driving pulley shaft 71b and the axis center of the driven pulley shaft 72b becomes smaller than the setting distance set in advance, and the second support part 77b at which the interaxial distance between the axis center of the driving pulley shaft 71b and the axis center of the driven pulley shaft 72b becomes equal to the aforementioned setting distance.

According to this, in assembling the driving device 70, the transmission belt 73 is allowed to be loosened in the beginning and the driving pulley shaft 71b moves from the first support part 77a to the second support part 77b, so that it is possible to gradually apply tension to the transmission belt 73. Thus, it is possible to easily wind the transmission belt 73 around the driving pulley 71 and the driven pulley 72.

Moreover, in the aforementioned embodiment, the second support part 77b is formed at one end portion of the circumferential direction in the support hole 77. Consequently, when the driving pulley shaft 71b has reached the second support part 77b from the first support part 77a, the movement of the driving pulley shaft 71b is restrained by a peripheral wall of the one end portion of the support hole 77. Consequently, it is possible to prevent the tension of the transmission belt 73 from exceeding a setting value due to excessive movement of the driving pulley shaft 71b.

Other Embodiments

In the aforementioned embodiment, the example, in which the driving device 70 has been applied to the conveying roller pairs 14 and 15 provided to the branch conveyance path V of the image forming apparatus 1, has been described; however, the technology of the present disclosure is not limited thereto. That is, the driving device 70, for example, can also be applied to a pachinko driving device and the like as well as an image forming apparatus.

Furthermore, in the aforementioned embodiment, the support hole 77 is formed only in a part in the circumferential direction of the concentric circle C; however, the technology of the present disclosure is not limited thereto and the support hole 77 may also be formed across the entire circumference of the concentric circle C.

What is claimed is:

1. A driving device including a driving pulley, a driven pulley, and an endless transmission belt wound around both pulleys, wherein
  the driving pulley has a driving pulley body having a peripheral surface formed in a cylindrical shape, and a driving pulley shaft and a gear part, which are coaxial with the driving pulley body and rotate together with the driving pulley body, and
  the driving device further comprising:
  an input gear engaged with the gear part to input rotational driving force to the gear part; and
  a support plate having a support hole that supports the driving pulley shaft so as to be rotatable,
  wherein the support hole is a long hole extending along a concentric circle for an axis center of the input gear and supporting the driving pulley shaft so as to be movable along the concentric circle.

2. The driving device of claim 1, wherein the support hole comprises:
  a first support part, at which an interaxial distance between an axis center of the driving pulley shaft and an axis center of the driven pulley shaft becomes smaller than a setting distance set in advance; and
  a second support part at which the interaxial distance between the axis center of the driving pulley shaft and the axis center of the driven pulley shaft becomes equal to the setting distance, the second support part being positioned at a downstream side from the first support part in a rotational direction of the input gear.

3. The driving device of claim 2, wherein the second support part is formed at one end portion of a circumferential direction in the support hole.

4. An image forming apparatus including the driving device of claim 1.

* * * * *